US009930901B2

United States Patent
Heijman et al.

(10) Patent No.: US 9,930,901 B2
(45) Date of Patent: *Apr. 3, 2018

(54) PROCESS FOR THE PRODUCTION OF A LIQUID COFFEE CONCENTRATE

(71) Applicant: Koninklijke Douwe Egberts B.V., Utrecht (NL)

(72) Inventors: Gertjan Heijman, Utrecht (NL); Harke Jan Bosma, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 113 days.

This patent is subject to a terminal disclaimer.

(21) Appl. No.: 14/817,810

(22) Filed: Aug. 4, 2015

(65) Prior Publication Data

US 2016/0029655 A1 Feb. 4, 2016

Related U.S. Application Data

(63) Continuation of application No. PCT/NL2014/050067, filed on Feb. 5, 2014.

(30) Foreign Application Priority Data

Feb. 5, 2013 (EP) .................................... 13154082

(51) Int. Cl.
| | |
|---|---|
| *A23F 5/00* | (2006.01) |
| *A23F 5/50* | (2006.01) |
| *A23F 5/24* | (2006.01) |
| *A23F 5/26* | (2006.01) |
| *A23F 5/28* | (2006.01) |

(52) U.S. Cl.
CPC ................ *A23F 5/505* (2013.01); *A23F 5/24* (2013.01); *A23F 5/26* (2013.01); *A23F 5/28* (2013.01); *A23F 5/285* (2013.01); *A23F 5/50* (2013.01)

(58) Field of Classification Search
None
See application file for complete search history.

(56) References Cited

U.S. PATENT DOCUMENTS

| | | | | |
|---|---|---|---|---|
| 6,086,936 A * | 7/2000 | Wilson | ................. | A23B 4/0056 426/521 |
| 6,139,537 A * | 10/2000 | Tapper | ................... | A61N 1/044 604/501 |
| 2010/0316784 A1 * | 12/2010 | Tonyes | ...................... | A23F 5/18 426/594 |

FOREIGN PATENT DOCUMENTS

| | | |
|---|---|---|
| EP | 0 352 842 A | 1/1990 |
| EP | 0 861 596 A1 | 9/1998 |
| EP | 1 374 690 A1 | 1/2004 |
| JP | H07-227211 A | 8/1995 |
| WO | WO-00/69274 A1 | 11/2000 |
| WO | WO-2007/043873 A1 | 4/2007 |

OTHER PUBLICATIONS

Cheng: WO 2000 069274; Stable coffee concentrate system; Nov. 23, 2000.*

(Continued)

*Primary Examiner* — Patricia A George
(74) *Attorney, Agent, or Firm* — Foley & Lardner LLP

(57) ABSTRACT

The invention relates to a process for the production of a liquid coffee concentrate that has an improved storage stability at ambient temperature. The process comprises treating a coffee concentrate to a heat treatment and a pH increasing step.

25 Claims, 5 Drawing Sheets

(56) References Cited

OTHER PUBLICATIONS

AGR: Ayton Global Research: Results of Independent Market Research Study on Green Coffee for Slimmers; published Jun. 2010; An independent Market Study on the effect of Green Coffee for Slimmers on weight loss.*

Heijman: Process for the production of a liquid coffee concentrate; WO2013019112; published Feb 7, 2013.*

Clarke, R.J. et al., Chapter Three, Chemistry III: Volatile Compounds; Coffee Recent Developments, 2001 (ISBN 0-632-05553-7), 24 pages.

International Search Report and Written Opinion for PCT Application No. PCT/NL2014/050067, dated Mar. 11, 2014, 12 pages.

Tikunov et al., A Novel Approach for Nontargeted Data Analysis for Metaboimics. Large-Scale profiling of Tomato Fruit Volatiles., Plant Physiology, Nov. 2005, pp. 1125-1137, vol. 139, American Society of Plant Biologists, 13 pages.

* cited by examiner

PROCESS FOR THE PRODUCTION OF A LIQUID COFFEE CONCENTRATE

CROSS-REFERENCE TO RELATED APPLICATIONS

This application is a continuation of International Application No. PCT/NL2014/050067, filed Feb. 5, 2014, which claims the benefit of priority to European Patent Application No. 13154082.5, filed Feb. 5, 2013, both of which are hereby incorporated herein by reference in their entireties.

TECHNICAL FIELD

The invention relates to a process for the production of a liquid coffee concentrate that has an improved storage stability at ambient temperature.

BACKGROUND

Liquid coffee, and liquid coffee concentrates, are increasingly in demand for commercial and/or industrial purposes. The production and sales of liquid coffee, e.g. liquid coffee concentrates for use in coffee dispensing machines, makes it desirable to provide liquid coffee that has a sufficient shelf-life. Up to now, such liquid coffee products are mostly available in a frozen form, and sometimes refrigerated. Non-refrigerated storage would decrease supply chain costs. However, any products sold for non-refrigerated storage still have an undesirably short shelf-life.

Generally speaking, a liquid coffee (such as a concentrate or an extract) is unstable over time and becomes increasingly acidic at room temperature. As is known by the skilled man, the pH drop might be due to microbial action and to chemical reaction, such as a slow hydrolysis reaction of some compounds such as esters and lactones, oxidation of carbonyl group containing compounds or even the Maillard reaction occurring among polysaccharides and proteins. A pH of 4.8 is commonly considered in literature as the lower limit for taste acceptability. Below that pH level the coffee extract becomes undrinkable.

To overcome microbial acidification the liquid coffee is often treated by UHT (Ultra High Temperature). Particularly suitable UHT treatment is at 120° C. for a couple of seconds.

A reference addressing the chemical acidification is US 2010/0316784. Therein a treatment is proposed comprising adding an edible alkali source to a liquid coffee concentrate. This serves to artificially increase pH. Before or after the addition of alkali, a heat treatment is conducted so as to artificially drive acid-generation reactions in the coffee concentrate to completion. More particularly, the heat treatment is conducted between 140 and 146° C. at a holding time of at most 3 minutes. This method fails, however, to produce products of sufficient shelf-life and quality.

Another drawback of the aforementioned process is the addition of alkali. In many jurisdictions, such an addition is considered undesired and/or the resulting product is no longer entitled to be called a "coffee", like under the EC food regulations. It would be desirable to develop a process for making liquid coffee whereby the addition of ingredients other than those obtained from a coffee extract itself is unnecessary, and yet provide a storage stable liquid coffee concentrate of good flavor qualities.

Another reference addressing the stabilization of liquid coffee by treatment with alkali is EP 861 596. Herein a coffee extract is treated with an alkali, which is present in an amount effective to convert acid precursors present in the coffee extract to their respective acid salts, and thereafter neutralizing the treated coffee extract with an acid, in an amount sufficient to neutralize any excess alkali from the first step. Apart from the aforementioned drawback of using alkali, this method also adds acid, which increases the amount of foreign components present in the liquid coffee. Moreover, the method is essentially based on introducing ionic substances (salts) which are prone to adversely affect taste.

Yet another reference addressing shelf life of liquid coffees is EP 1 374 690. Herein a coffee extract is subjected, essentially immediately after preparation, to correction of acidity by the addition of a base or an anion resin. The resulting extract is subjected to pasteurisation. The pasteurisation is discussed with reference to holding times and temperatures that do not affect the organoleptic properties of the coffee extract. A typical temperature range is 100° C.-140° C. at a holding time of at most 1 minute. This method fails also to produce products of sufficient shelf-life and quality.

The object of the present invention is to provide a process with which an improvement of the quality of the coffee concentrate is obtained in storage stability as well as in flavor.

SUMMARY OF THE INVENTION

In order to better address one or more of the foregoing desires, the invention, in one aspect, presents a process for the production of a liquid coffee concentrate with a pH of 4.8 to 6 comprising the steps of a) subjecting roasted, ground coffee to one or more extraction steps with water resulting in a coffee extract, b) subjecting the coffee extract to separation, either by fractionation during said extraction step(s) or by aroma recovery after said extraction step(s) resulting in a high aromatic coffee extract and a low aromatic coffee extract, c) concentrating the low aromatic coffee extract to a dry matter content of at least 10 wt. %, d) subjecting at least 25 wt. % dry matter of the low aromatic coffee concentrate to a heat treatment of at least 150° C. at a holding time for at most 15 minutes, e) combining at least the low aromatic coffee concentrate with the high aromatic coffee extract, whereby after step b) a pH increasing step is carried out, thereby obtaining a liquid coffee concentrate.

In another aspect, the invention provides a liquid coffee concentrate with a pH of 4.8 to 6 obtainable by the above-mentioned process. Said coffee concentrate is particularly characterized by comprising 1.25 mg/kg dry matter solids or more of 2-phenyl-3-(2-furyl)-2-propenal.

In a still further aspect, the invention presents a liquid coffee concentrate with a pH between 5 and 5.2 and a QA/QaL (Quinic acid/Quinic acid lactone) mol/mol ratio between 10 and 100, preferably between 30 and 100.

DETAILED DESCRIPTION

Figure 1:
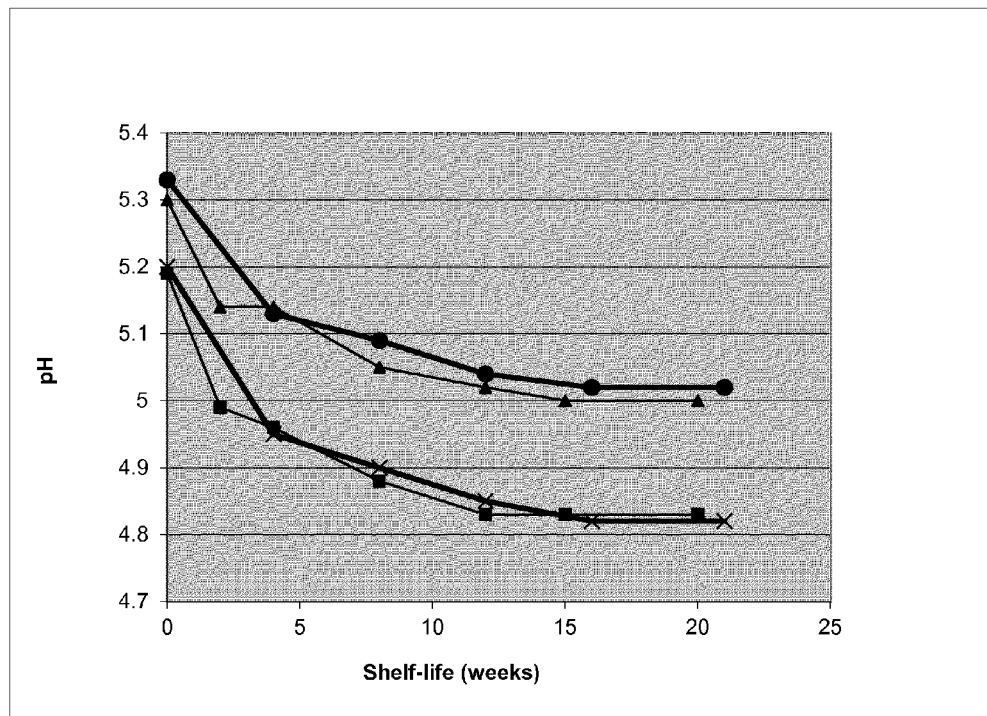
FIG. 1 is a chart depicting the pH level versus time for liquid coffee concentrates prepared in accordance with Example 1 herein, according to one embodiment.

In a broad sense, the invention is based on the judicious insight to conduct a relatively strong heat treatment at a certain holding time on a coffee concentrate wherefrom aroma components have been recovered prior to concentration. Further, the invention provides a judicious combination of such a heat treatment step and a pH-rising treatment (i.e., a pH increasing step). More preferably, the pH increasing step does not involve the addition of alkali. Most preferably, the process results in a hydrolysation of at least 120 mmoles acid/kg dry matter solids content in the final product. This is the difference between the amount of mmoles acid/kg dry matter solids content in the low aromatic coffee concentrate to be treated before and after the heat treatment multiplied by the wt/wt ratio dry matter solids content of the total low aromatic coffee concentrate in the final product. Preferably, the process results in a hydrolysation of at least 150 mmoles acid/kg, more preferably 180 mmoles acid/kg dry matter solids content in the final product.

The coffee chosen for the extraction in step a) can be any type of roasted coffee. The provision of roasted coffee is well-known to the skilled person. E.g., the starting material can be a customary coffee bean raw material for industrial extraction processes, which coffee origins are roasted in the customary manner. As a rule, to that end, a mixture of different types of coffee origins is used. The roasted coffee beans are ground, while generally, for the degree of grinding a compromise is sought between obtaining the largest possible surface and obtaining a lowest possible pressure drop across the extraction cell. As a rule, the ground beans have an average size of 2.0 millimeters.

In order to better preserve coffee aromas, the process of the present invention is conducted on a low aromatic coffee extract. This is obtained by a) subjecting roasted, ground coffee to one or more extraction steps with water resulting in a coffee extract, and b) separating the coffee extract (i.e., subjecting the coffee extract to separation), either by fractionation during the extraction step(s) in a) or by aroma recovery after step a) resulting in a high aromatic coffee extract and a low aromatic coffee extract.

The skilled person will understand that separation by fractionation results in a fractionated collection of the extract, and that other separation methods, or combinations of, e.g., fractionated collection of the extract and aroma recovery, can be employed.

Examples of aroma recovery after step a) include steam stripping, supercritical CO2 extraction, and pervaporation. In another embodiment, the coffee extract is fractionated during the extraction step a). The specific coffee aroma, present in the high aromatic coffee extract resulting therefrom, has a more natural coffee character compared to coffee aroma recovered by means of steam stripping from the complete extract after step a). A high aromatic coffee extract and a low aromatic coffee extract are obtained. As known to a skilled man, a high aromatic coffee extract distinguishes itself from a low aromatic coffee extract by having a comparably high amount of volatile flavor compounds compared to semi volatile flavor compounds. Such compounds are known for example from Clarke R. J. and Vitzthum O. G., Coffee Recent Developments, 2001 (ISBN 0-632-05553-7), p. 71, table 3.3. From this table it is clear that on the one hand propanal, methyl propanal, and 2,3 butanedione are measurable volatile flavor compounds. Pyrazine compounds and guaiacol compounds on the other hand are semi volatile flavor compounds. Taking e.g. 2,3-butanedione as an example of a volatile coffee flavor compound and ethyl guaiacol (4-ethyl 2-methoxyphenol) as an example of a semi volatile coffee flavor compound, when these compounds are in a wt/wt ratio of 2,3-butanedione/ethyl guaiacol >30 in a particular coffee extract, that extract can be described as a high aromatic coffee extract. Consequently, a low aromatic coffee extract has a wt/wt ratio of 2,3-butanedione/ethyl guaiacol <30.

The high aromatic coffee extract is stored.

The low aromatic coffee extract is concentrated prior to the heat treatment. A concentrate is distinguished from an extract by having undergone a substantial water removing step such as water evaporation. The low aromatic coffee concentrate will generally have a dry matter solids content of at least 10% by weight, preferably from 10 to 60% by weight, more preferably from 15 to 50% by weight, most preferably from 15 to 40% by weight.

At least 25 wt % dry matter, preferably 50 wt % dry matter, more preferably 75 wt % dry matter, most preferably all (100%) of the low aromatic coffee concentrate is subjected to a heat treatment of at least 150° C. at a holding time of at most 15 minutes. In general, the higher the temperature the shorter the holding time. In this respect, the above-mentioned publications teach away from the present invention as the temperatures and holding times disclosed are below 150° C. and shorter than 3 minutes. Preferably, the heat treatment is conducted at at least 150° C. at a holding time of at most 10 minutes. More preferably, the heat treatment is conducted from 150° C. to 200° C. at a holding time of 10 minutes to 10 seconds. Most preferably, the heat treatment is conducted from 150° C. to 180° C. at a holding time of 10 minutes to 10 seconds. As a particular example the heat treatment can be conducted from 160-170° C. with a holding time of about 5 minutes to 30 seconds.

Heating times may include heating from ambient temperature to the holding temperature during 1-8 minutes, preferably 3-5 minutes.

Cooling times may include cooling to ambient temperature during 1-8 minutes, preferably 3-5 minutes.

The process also comprises a pH increasing step (de-acidification or pH adjustment step) whereby after step b) a pH increasing step may be carried out.

With the pH increasing step the pH is raised to a less acidic (more alkaline) pH. This raise is relative to the starting pH. I.e., if the starting pH is 4, the pH rise could be to a value that is still acidic, e.g. 5. However, preferably the starting pH of the coffee stream is 4.5 to 6.5, more preferably of from 4.9 to 5.7. After the treatment steps the pH will again be at normal level such as between 4.8 and 6. Preferably, after step b) and before step e) the low aromatic coffee extract or the low aromatic coffee concentrate which is (to be) heat treated is subjected to a pH increasing step. More preferably, the pH increasing step may be carried out between step b) and c), between step c) and d) and/or between step d) and e). If the pH increasing step is carried out between step b) and c) or between step c) and d) the low aromatic coffee concentrate preferably has a pH value of from 6-8. Preferably, in the event that only part of the low aromatic coffee concentrate is heat treated only that part will be subjected to the pH increasing step. If the pH increasing step is carried out between step d) and e) the low aromatic coffee concentrate preferably has a pH value of from 5-6. Preferably, in the event that only part of the low aromatic coffee concentrate is heat treated this pH increasing step will preferably be carried out on the total of low aromatic coffee concentrate. Alternatively, the pH increasing step may be carried out after step e) whereby the low aromatic concentrate is subjected to the pH increasing step in combination with the high aromatic coffee extract. The liquid coffee concentrate preferably has a pH value of from 5-6.

The pH-increasing step can be conducted by adding edible alkali. Sources of edible alkali are known, and have also been described in the aforementioned US 2010/0316784.

More preferably, however, the pH increasing step is conducted without adding alkali. By avoiding the addition of foreign substances, it is secured that the product after treatment remains considered to be "coffee" in accordance with the applicable food legislation in many jurisdictions. For, in such jurisdictions the addition of substances other than those obtained from the extraction will result in a product that is not allowed to be indicated as a coffee. It will be understood that such a product may receive a different perception by consumers. An underlying technical problem thus is the provision of a process that sufficiently treats the coffee so as to result in a product of sufficient storage stability and aroma quality, yet without the addition of foreign substances such as edible alkali.

This is secured in a preferred embodiment of the invention, wherein in the pH increasing step use is made of an ion exchange resin and/or an adsorber. The adsorber may be carbon based, polyacrylate based or polystyrene based. Examples of commercial adsorbers include Purolite® MN 200, Purolite® MN 202, and Lewatit® AF5. Examples of the ion exchange resins include strong or weak basic anion exchange resins. Preferably, the ion exchange resin is a weak basic anion exchange resin. The resin is based on polyacrylate or polystyrene, preferably polyacrylate. The functional groups are e.g. amine functional groups, such as primary, tertiary, and quaternary amine groups as well as polyamine groups, preferably tertiary amine groups. In the following table examples of commercial ion exchange resins are listed.

| Name | Matrix | gel/macro-porous | functional group | % of quaternary amines (SBA) | total capacity (eq/L) |
| --- | --- | --- | --- | --- | --- |
| Rohm & Haas IRA 67 Novasep ® XA 945 | poly-acrylic | gel | tertiary amine | 24% | 1.6 |
| Lewatit ® MP 62 | poly-styrene | macro-porous | tertiary amine | 3% | 1.7 |
| Purolite ® A 172 | poly-styrene | gel | tertiary amine | 2% | 1.2 |
| Lewatit ® A 365 | poly-acrylic | gel | poly amine | | |
| Lewatit ® VP OC 1075 | poly-acrylic | gel | poly amine | 14% | 2.9 (3.4) |
| Lewatit ® VP OC 1065 | poly-styrene | macro-porous | primary amine | | 2.2 |
| Lewatit ® MonoPlus M 500 | poly-styrene | gel | quaternary amine, Type I | 100% | 1.2 |
| Lewatit ® M 600 | poly-styrene | gel | quaternary amine, Type II | 100% | 1.1 |

In a preferred embodiment of the process of the invention, the pH rise of the low aromatic concentrate is conducted prior to the heat treatment (step d). The pH increasing step may then be carried out before or after concentration step c). This choice may depend on the dry matter content of the low aromatic coffee concentrate and the configuration of the ion exchange resin used. Preferably, when the dry matter content of the low aromatic coffee concentrate is 25% or higher, preferably 30% or higher, the pH increasing step may be conducted prior to concentration. When the dry matter content of the low aromatic coffee concentrate is less than 35%, preferably less than 30%, the pH increasing step may be carried out before or after concentration step c).

In the event that part (i.e. at least 25%) of the low aromatic coffee concentrate has been treated, the untreated low aromatic coffee concentrate may be combined with the treated low aromatic coffee concentrate before step e).

Generally, after heat treatment (and optional addition of the untreated low aromatic coffee concentrate), the treated low aromatic concentrate is mixed with the high aromatic extract. This can be done in the factory before optionally further treatment steps and packaging or just before dosing by the consumer. In the latter case, two separate packages are provided to the consumer to be introduced in the coffee preparing machine.

In the factory, after temporary, preferably cooled, storage, preferably at a temperature below 25° C., more preferably below 10° C., most preferably below 0° C., the high aromatic coffee extract may directly, without further processing, be added to the low aromatic coffee concentrate. It is preferred that the high aromatic coffee extract is stored as briefly as possible and cooled, preferably at an atmosphere of an inert gas such as nitrogen for adding to the low aromatic coffee concentrate; owing to these steps loss of aroma and aroma degradation reactions are limited as much as possible.

Accordingly, the present process provides for a liquid coffee concentrate with a pH of 4.8 to 6 that can be stored at ambient temperature (generally indicating a temperature of 5° C. to 25° C., and preferably without the need for refrigerating equipment) at an acceptable shelf-life without acidification to occur, and capable of being kept without substantial off-flavors to arise.

In a preferred embodiment, the extraction in step a) is preferably done as a split extraction. Processes of split extraction are known. A reference in this respect is WO 2007/043873. More particularly, the process involves primary and secondary extraction.

In a preferred embodiment of split extraction, the invention is put to use in the following method for preparing a coffee concentrate. In the method, roasted, ground coffee is subjected to a primary extraction with water, whereby a first primary extract (i.e. the high aromatic coffee extract) is obtained with a draw-off factor of at most 2.5, preferably at most 2.0, more preferably at most 1.5 and most preferably at most 1.0. Thereafter, optionally, a second primary extract is obtained.

The primarily extracted, roasted, ground coffee is then fed to a secondary extraction section in which, with water having a feed temperature between 120 and 210° C., a secondary extract is obtained (the low aromatic coffee extract). At least 25 wt % dry matter, preferably 50 wt % dry matter, more preferably 75 wt % dry matter, most preferably all (100%) of the secondary extract is then subjected to the process steps of the present invention. Optionally, the second primary extract may be added to the secondary extract (the low aromatic coffee extract) before or after the treatment step(s) of the present invention, preferably the second primary extract is added before the treatment to the secondary extract.

The term "draw-off factor" is understood to mean the ratio of the mass of the extract and the mass of the dry roasted and ground coffee in the primary extraction cell. In practice, this draw-off factor is determined by a compromise between, on the one side, a sufficient degree of coffee aroma recovery in the first primary extract, and, on the other side, a lowest possible volume of the first primary extract. The draw-off factor for that matter depends on the used coarseness or degree of grinding of the roasted coffee, the extraction cell and, in particular, the number of percolators placed in series, the used water-coffee ratio, the cycle time, the feed water temperature and the desired concentration of the end product and the like.

In a further preferred embodiment of split extraction, also a second primary extract is recovered from the primary extraction cell. To that end, after draw-off and storage of the first primary extract, further extraction takes place in the primary extraction cell.

The recovery of both a first and second primary extract is particularly attractive when a high water-coffee ratio is applied. Preferably, the water-coffee ratio is between 5.0 and 15. More preferably, the water-coffee ratio is lower than 10, and most preferably, the water-coffee ratio is between 6.5 and 8.5.

When a second primary extract is recovered, preferably, the first fraction of the secondary extract is indeed used as primary feed water in the first extraction cell. For this embodiment, the teachings of EP-A-0 352 842 are included herein by reference.

The second primary extract can be subjected to aroma recovery. The recovered aromas are added to the high aromatic extract. The second primary extract after the aroma recovery may be added to the secondary extract (the low aromatic coffee extract) before or after the treatment step(s) of the present invention, preferably the second primary extract is added before the treatment to the secondary extract. After treatment the low aromatic coffee concentrate and the high aromatic coffee extract (comprising the recovered aromas) are combined.

In this embodiment of the invention, the primary extraction is carried out with water at a feed water temperature which is lower than that which is used in the secondary extraction. Preferably, the temperature at which the primary extraction is carried out is between 70 and 120° C.

The primary extraction can be carried out as an exhaustive extraction. "Exhaustive extraction" is understood to mean that extraction takes place until the extract hardly, if at all, differs from the water introduced into the extraction cell. In practice however, it will be beneficial to the efficiency of the entire process, in particular because of the subsequent concentration steps, when extraction is not exhaustive.

"Water" for that matter is understood to include customary aqueous solutions that can also be used in the known industrial extraction processes.

The primary and secondary extractions can be carried out in customary extraction cells. In a preferred embodiment, both the primary and the secondary extraction are carried out in a percolator or in percolators placed in series. In particular, the secondary extraction is advantageously carried out in at least 2, and preferably at least 4 series-connected percolators. As a rule, the number of percolators used in the primary extraction section is at least 0.5 which means that during 50% of the cycle time a percolator is connected in the primary extraction section. Preferably, at least 1 or 2 percolators are connected in the primary extraction section.

In a preferred embodiment of the process according to the invention, the low aromatic coffee extract is at least part but preferably the total of a secondary extract. In one further preferred embodiment hereof, the treated low aromatic coffee extract is combined with a second primary extract prior to the concentration step. In another preferred embodiment hereof, the low aromatic coffee extract is a mixture of at least part but preferably the total secondary extract and the second primary extract.

It has also been found that the second primary extract can be subjected to the treatment of the present invention. In that respect, both the second primary extract and the secondary extract are considered the low aromatic coffee extract of which at least part of the second primary extract is treated which part to be treated comprises at least 25 wt % dry matter, more preferably at least 35 wt % dry matter, most preferably at least 50 wt % dry matter of the low aromatic coffee extract. After the treatment, the treated part of the second primary extract is added to the non-treated part of the second primary extract and the secondary extract and concentrated. Preferably, all of the second primary extract is treated.

Preferred is also the use of customary liquid or dried filler components. A filler component is sometimes used to neutralize the marked flavour character of the first primary extract to some extent. The filler is preferably a high yield coffee product. It may be added to the low aromatic coffee extract prior to the treatment step(s).

The invention also pertains to a liquid coffee concentrate with a pH of 4.8 to 6 obtainable by a process according to the invention. The liquid coffee concentrate comprises 6 wt. % to 80 wt. % coffee solids (i.e. dry matter), preferably 10 wt. % to 65 wt. %, more preferably 15 wt. % to 50 wt. %. This coffee concentrate is distinguished from coffee concentrates not according to the invention, on account of its better storage stability at ambient temperature, as can be identified with reference to the reduced, or preferably absent, pH lowering, and to reduced, and preferably absent occurrence of off-flavors. Preferably, the liquid coffee concentrate has a storage stability of more than 6 months, more preferably more than 12 months, most preferably more than 18 months.

A product treated by the process according to the present invention distinguishes itself by comprising at least 1.25 mg/kg dry matter of 2-phenyl-3-(2-furyl)-2-propenal.

Accordingly, the present invention also relates to a liquid coffee concentrate with a pH of 4.8 to 6 comprising at least 1.25 mg/kg dry matter solids of 2-phenyl-3-(2-furyl)-2-propenal, preferably between 1.5 mg/kg dry matter solids and 80 mg/kg dry matter solids, more preferably between 2 mg/kg dry matter solids and 40 mg/kg dry matter solids, most preferably between 4 mg/kg dry matter solids and 40 mg/kg dry matter solids.

Alternatively, a product treated by the process according to the present invention distinguishes itself by having a QA/QaL mol/mol ratio between 10 and 100 at a pH between 5 and 5.2. More particularly, during the shelf life the liquid coffee concentrate will enter a pH window between 5 and 5.2. In that pH window it should have a QA/QaL mol/mol ratio between 10 and 100.

Accordingly, the present invention also relates to a liquid coffee concentrate with a pH between 5 and 5.2 and a QA/QaL mol/mol ratio between 10 and 100, preferably between 30 and 100, most preferably 60 to 100. In a preferred embodiment, this liquid coffee concentrate will have a potassium content of 55 g or less per kg dry matter, preferably 20-55 g/kg and/or a sodium content of 4 g or less per kg dry matter, preferably 0.1-4 g/kg.

The abbreviation QA stands for Quinic acid, i.e. 1,3,4,5-tetrahydroxycyclohexanecarboxylic acid. The abbreviation QaL stands for Quinic acid lactone, i.e. 1,3,4-trihydroxy-6-oxabicyclo[3.2.1]octan-7-one.

Alternatively, a product treated by the process according to the present invention distinguishes itself by comprising a beta-damascenone content of 8.5 µg/kg dry matter solids or less. It has been established by the inventors that the content of beta-damascenone provides an accurate indication whether the final liquid coffee concentrate has an off-taste. A liquid coffee concentrate having a beta-damascenone of 8.5 µg/kg dry matter solids or less has practically no off-taste. Accordingly, the present invention also relates to a liquid coffee concentrate with a pH of 4.8 to 6 comprising 8.5 µg/kg dry matter solids or less of beta-damascenone.

Figure 7:
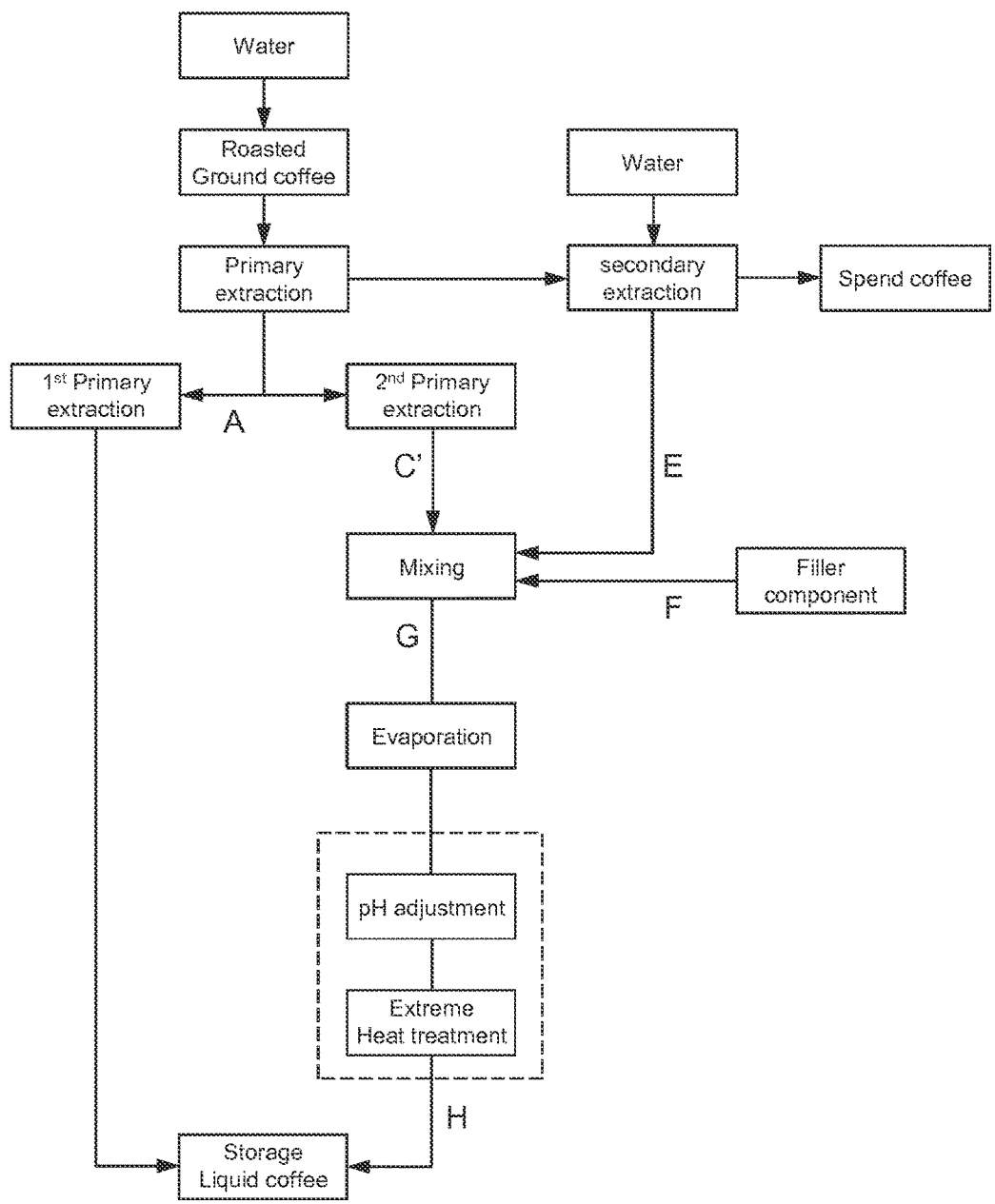
FIG. 7 is a flow chart of a process of making a coffee concentrate, according to one embodiment.
Figure 8:
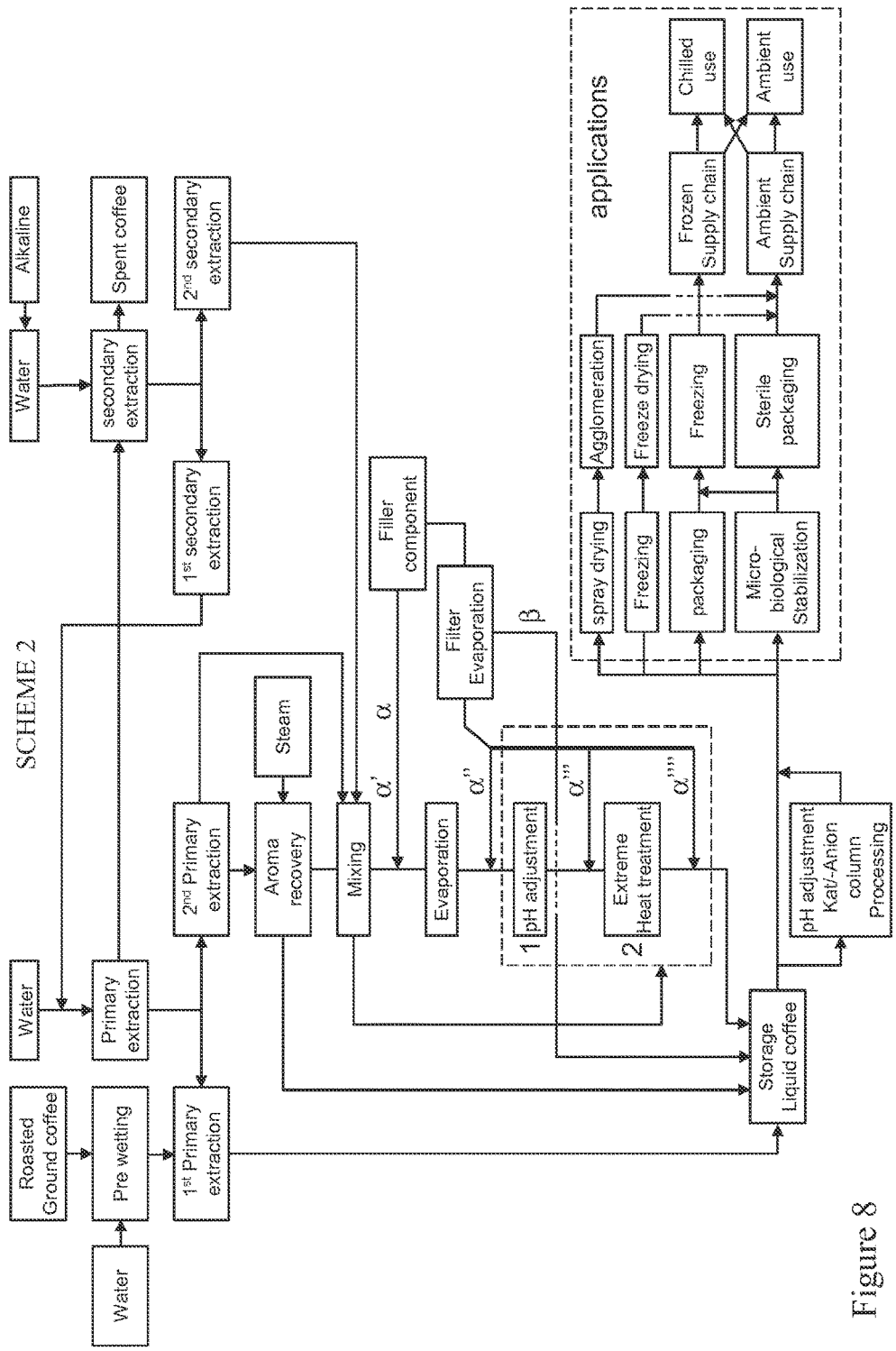
FIG. 8 is a flow chart of a process of making a coffee concentrate, according to another embodiment.

Various embodiments of the invention are further explained with reference to the Examples and Schemes 1 and 2, shown in FIGS. 7 and 8, which provide process schemes for implementing the treatment steps of the invention in processes for making coffee concentrates. These schemes serve illustrative purposes, and do not limit the invention.

In Scheme 1 (FIG. 7), a preferred embodiment of the invention is illustrated. Roasted coffee is subjected to split extraction, with split tapping (rendering first and second primary and secondary extractions). The second primary extract is combined with the second secondary extract (and optionally a filler component), and this stream is subjected first to evaporation, then to pH adjustment (by anion exchange), and extreme heat treatment (at the above-identified temperatures). The low aromatic coffee concentrate is combined with the first primary extract resulting in a liquid coffee concentrate of the present invention. Alternatively, the pH adjustment can be carried out before the evaporation step or after the heat treatment step.

Scheme 2 (FIG. 8) illustrates a further preferred embodiment. Therein, either the second secondary extract or the 2nd primary extract or both and mixtures thereof are concentrated and subjected to the pH adjustment by anion exchange and heat treatment, before being combined with the first primary extract. The 2nd primary extract is subjected to aroma recovery, so that after treatment the low aromatic coffee concentrate is mixed with 1st primary extract as well as the aroma recovery product. Optionally, a filler component can be added either before or after treatment. Alternatively, the pH adjustment can be carried out before the evaporation step or after the heat treatment step.

Analytical Method for QA and QaL

Quinic acid lactone (QaL), was obtained from Syncom, Groningen, the Netherlands. A working solution of approximately 0.5 mg per ml was obtained by diluting QaL in acetonitrile. This working solution was further diluted in 0.1% acetic acid in acetonitrile to obtain calibration solutions of 15 ng/ml up to 15000 ng/ml.

Concentrated coffee products were diluted with water to 0.28% dry matter.

50 µl of the diluted coffee product is further diluted with 950 µl 0.1% acetic acid in acetonitrile.

Quantification was performed with a Triple Quad MS, TSQ Quantum Ultra; Thermo Scientific Mass spectrometer coupled to a Accela UPLC from Thermo Scientific.

Concentrations were calculated from the calibration curve.

Quinic acid (QA), was obtained from Aldrich. A working solution of approximately 1 mg per ml was obtained by dissolving the compound in water. This working solution was further diluted in 0.4 mM heptafluorobutyric acid to obtain calibration solutions of 10 µg/ml up to 40 µg/ml.

Concentrated coffee products were diluted with 0.4 mM heptafluorobutyric acid to 0.1% dry matter (w/w) dry coffee solids.

Quantification was performed with a Dionex ICS 5000 DC suppressed conductivity chromatograph.

Concentrations were calculated from the calibration curve.

Analytic Method for 2-phenyl-3-(2-furyl)-2-propenal 2-phenyl-3-(2-furyl)-2-propenal, was obtained from Chemos GmbH, Werner-von-Siemens-Straße, D-93128 Regenstauf, Germany (purity 97%). A working solution of 1 mg per ml was obtained by diluting the compound in hexane. This working solution was further diluted to obtain calibration solutions of 0, 0.6, 1, 3, 6, 10 and 50 µg 2-phenyl-3-(2-furyl)-2-propenal per ml hexane.

Liquid coffee concentrates were diluted with water to 2.5% dry matter.

Volatiles in the coffee headspace were analysed by solid phase micro-extraction (SPME) coupled to gas chromatography/mass spectrometry (GC/MS), essentially as described in Tikunov et al., 2005, Plant Physiology 139, 1125-1137, was calculated from the linear calibration curve of the authentic standard in the coffee matrix.

Analytic Method for Beta-Damascenone

In this technique, the samples were stirred with a Stir Bar coated with an adsorbent material (polydimethylsiloxane (PDMS)). The extracted compounds were injected by means of thermal desorption onto the beginning of the capillary GC-column and then separated during a temperature programmed GC analysis and detected with a mass spectrometer.

Gas chromatography-Mass spectrometry analysis were carried out with a Finnigan Trace GC ultra (Thermo Fisher Scientific, Waltham, Mass.) and a ISQ mass detector (Thermo Fisher Scientific, Waltham, Mass.).

A calibration curve was prepared by standard addition of commercially available beta-damascenone in a range of 0-15 ppb. The concentration of beta-damascenone was calculated from the calibration curve.

EXAMPLE 1

From a single batch of ground coffee, a coffee extract is obtained by split stream extraction as described in WO 2007/043873. This results in a first primary extract (PE1), a second primary extract (PE2), and a secondary extract (SE). PE1, which is high in flavour, being a high aromatic coffee extract, is left untreated. All of the second primary extract and the secondary extract are mixed, resulting in an extract stream (PE2+SE) composed of 50 wt. % secondary extract and 50 wt. % 2nd primary extract on dry matter.

The primary extract, i.e. the high aromatic coffee extract, comprises 15 wt. % of the total coffee dry matter and has a BD/EG wt/wt ratio of 56. The low aromatic coffee extract comprises 85 wt. % of the total coffee dry matter.

The latter extract stream (PE2+SE) is concentrated by being subjected to evaporation. A first batch is concentrated to a dry matter solids content of 15%, a second batch to a dry matter solids content of 30%. Both concentrates are subjected to comparative further treatments. Of either concentrate 50% is passed over an anion column (Novasep® XA 945 ex Applexion) so as to have its pH increase to 6. The other 50% of the concentrates are not subjected to a pH increasing step, but are left unchanged.

The two samples of anion-treated concentrates are then subjected to a heat treatment at 160° C. for 0.5 minute (the 15% concentrates), respectively 1 minute (the 30% concentrates).

Thus four samples result, an overview of which is given in the table below.

Overview of low aromatic coffee concentrate samples of Example 1

| Sample# | dry matter solids | pH increasing step | Heat treatment |
|---------|-------------------|--------------------|----------------|
| 1a      | 15%               | —                  | —              |
| 1b      | 15%               | pH 6               | 0.5 min/160° C.|
| 1c      | 30%               | —                  | —              |
| 1d      | 30%               | pH 6               | 1 min/160° C.  |

Subsequently, equal amounts of the first primary extract stream (PE1) are added to all of the four concentrates. This results in four liquid coffee concentrates (LCC#1-4).

For the treated liquid coffee concentrates it is determined how much acid is hydrolysed per kg dry matter solids. This is measured after the heat treatment and before the addition of PE1. The amount of acids was assessed by titration up to pH 8.

In Table 1 below an overview is given of the resulting liquid coffee concentrates and the effect of treatment in terms of acid hydrolysis as mmol acid/kg dry matter solids content in the final product. The liquid coffee concentrates marked "ref" are not in accordance with the invention.

TABLE 1

Resulting liquid coffee concentrates (LCC) of Example 1

| LCC# | Based on sample# | Dry matter solids | Acid hydrolysis (mmol/kg d.m.) | β-damascenone (µg/kg d.m.) |
|------|------------------|-------------------|-------------------------------|----------------------------|
| $1_{ref}$ | 1a | 15 | — | — |
| 2    | 1b | 15 | 140 | — |
| $3_{ref}$ | 1c | 25 | — | 3.8 |
| 4    | 1d | 25 | 140 | 5.4 |

The pH was followed in time as shown in FIG. 1 for LCC#1 (■), 2 (▲), 3(x), and 4 (●). During 20 weeks shelf life the products according to the invention do not drop in pH below 5. The QA/QaL mol/mol ratio is then 54 for LCC#2 and 72 for LCC#4.

EXAMPLE 2

A single batch of *Arabica* coffee is subjected to extraction whereby aromas were fractionated from a high aromatic coffee by means of steam distillation as described in EP-A-0 352 842. The following streams of coffee extract are obtained:
 i) a high aromatic coffee extract (AR);
 ii) a further primary extract (PE);
 iii) a secondary extract (SE).

Extract i) is left untreated. Extracts ii) and iii) are combined and divided into three batches (2a, 2b, and 2c), which are subjected to the following parallel treatments:
 2a evaporation to a concentration of 38% of dry matter solids;
 2b evaporation to a concentration of 38% of dry matter solids followed by a heat treatment of 10 minutes at 160° C. and then a pH increasing step to 5.5 by addition of KOH;
 2c a pH increasing step as defined in Example 1, followed by evaporation to a concentration of 38% of dry matter solids, and then followed by a heat treatment of 10 minutes at 160° C.

Subsequently, the high aromatic coffee extract is added. This results in three liquid coffee concentrates (LCC#5-7). For these liquid coffee concentrates it is determined how much acid is hydrolysed per kg dry matter solids as a result of the treatment(s) conducted. The results are given in Table 2 below.

TABLE 2

Resulting liquid coffee concentrates (LCC) of Example 2

| LCC# | Based on sample# | Dry matter solids | Acid hydrolysis (mmol/kg d.m.) | β-damascenone (µg/kg d.m.) | 2-phenyl-3-(2-furyl)-2-propenal (mg/kg d.m.) |
|------|------------------|-------------------|-------------------------------|----------------------------|----------------------------------------------|
| $5_{ref}$ | 2a | 25 | — | — | — |
| 6    | 2b | 25 | 215 | — | — |
| 7    | 2c | 25 | 315 | 16.9 | 1.7 |

Figure 2:
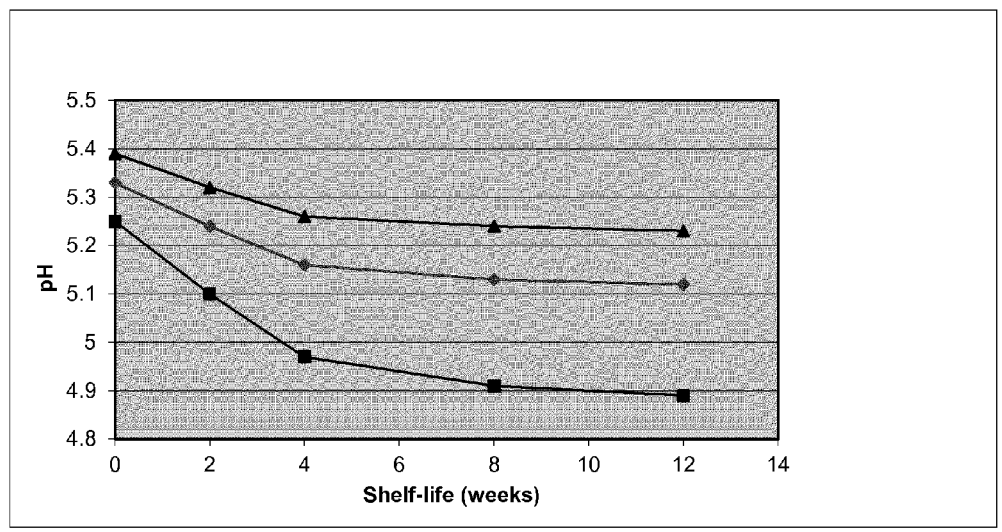
FIG. 2 is a chart depicting the pH level versus time for liquid coffee concentrates prepared in accordance with Example 2 herein, according to one embodiment.

The pH was followed in time as shown in FIG. 2 for LCC#5 (■), 6 (♦), and 7 (▲). During 12 weeks shelf life the products according to the invention do not drop in pH below 5.

EXAMPLE 3

Split stream extraction is conducted as in Example 1. The primary extract has a BD/EG wt/wt ratio of 74. An extract stream (PE2+SE) is concentrated, to a dry matter solids content of 15%, by being subjected to evaporation.

The resulting concentrate is divided into four batches (3a, 3b, 3c, and 3d), which are subjected to the following parallel treatments:
 3a no treatment;
 3b a pH increasing step as conducted in Example 1 (pH=6), followed by a heat treatment of 30 seconds at 160° C.;
 3c as in 3b, but with the heat treatment at 180° C.;
 3d as in 3b, but with the heat treatment at 200° C.

Subsequently, the high aromatic extract is added. This results in four liquid coffee concentrates (LCC#8-11). For these liquid coffee concentrates it is determined how much acid is hydrolysed per kg dry matter solids as a result of the treatment(s) conducted. The results are given in Table 3 below. During 14 weeks shelf life the products according to the invention do not drop in pH below 5. The QA/QaL mol/mol ratio is then 38 for LCC#9, 51 for LCC#10, and 66 for LCC#11. The amount of potassium is 54.8 g/kg dry matter and the amount of sodium is 2.3 g/kg dry matter.

TABLE 3

Resulting liquid coffee concentrates (LCC) of Example 3

| LCC# | Based on sample# | Dry matter solids | Acid hydrolysis (mmol/ kg d.m.) | β-damascenone (μg/kg d.m.) | 2-phenyl-3-(2-furyl)-2-propenal (mg/kg d.m.) |
|---|---|---|---|---|---|
| $8_{ref}$ | 3a | 14 | — | 4.8 | 0.3 |
| 9 | 3b | 14 | 155 | 6.1 | 0.6 |
| 10 | 3c | 14 | 230 | 8.0 | 1.5 |
| 11 | 3d | 14 | 360 | 13.7 | 4.5 |

EXAMPLE 4

This example is similar to example 3. The primary extract has a BD/EG wt/wt ratio of 51. The exact treatment conditions per sample are as follows:
4a no treatment;
4b a pH increasing step (pH=6), followed by a heat treatment of 10 seconds at 180° C.;
4c as in 4b, but with the heat treatment for 30 seconds;
4d as in 4b, but with the heat treatment for 60 seconds.

Subsequently, the high aromatic extract is added. In this example four liquid coffee concentrates (LCC#12-15) are obtained. The results are given in Table 4 below.

TABLE 4

Resulting liquid coffee concentrates (LCC) of Example 4

| LCC# | Based on sample# | Dry matter solids | Acid hydrolysis (mmol/ kg d.m.) | β-damascenone (μg/kg d.m.) | 2-phenyl-3-(2-furyl)-2-propenal (mg/kg d.m.) |
|---|---|---|---|---|---|
| $12_{ref}$ | 4a | 14 | — | 4.5 | — |
| 13 | 4b | 14 | 195 | 6.9 | 1.6 |
| 14 | 4c | 14 | 210 | 8.4 | — |
| 15 | 4d | 14 | 230 | 8.2 | 1.9 |

Figure 3:
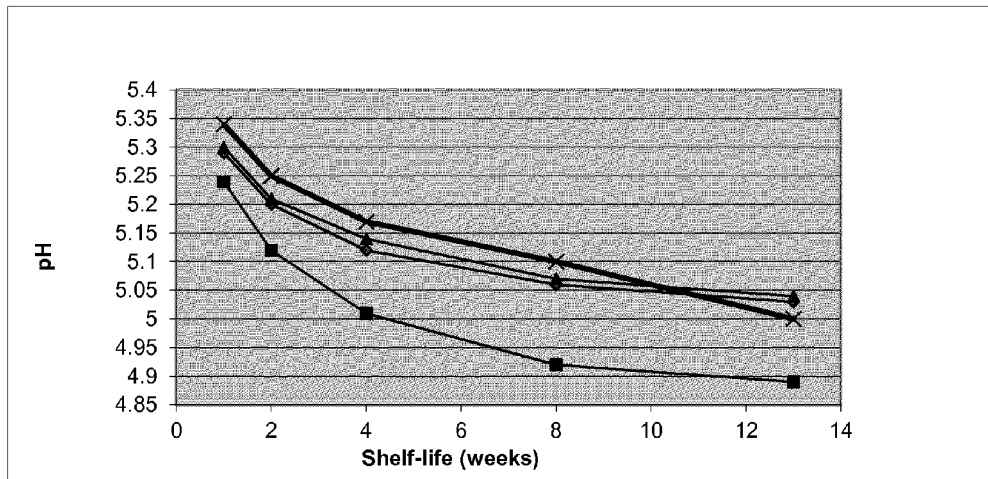
FIG. 3 is a chart depicting the pH level versus time for liquid coffee concentrates prepared in accordance with Example 4 herein, according to one embodiment.

The pH was followed in time as shown in FIG. 3 for LCC#12 (■), 13 (♦), 14 (▲) and 15 (x). During 13 weeks shelf life the products according to the invention do not drop in pH below 5. The QA/QaL mol/mol ratio is then 20 for LCC#13, 22 for LCC#14, and 24 for LCC#15. The amount of potassium is 48.5 g/kg dry matter and the amount of sodium is 2 g/kg dry matter.

Example 5

Split stream extraction is conducted as in Example 1. The primary extract has a BD/EG wt/wt ratio of 48. An extract stream (PE2+SE) is concentrated to a dry matter solids content of 25%, by being subjected to evaporation.

The resulting concentrate is divided into three batches (5a, 5b, 5c), which are subjected to the following parallel treatments:
5a no treatment;
5b a pH increasing step (pH=6), followed by a heat treatment of 30 seconds at 180° C.;
5c as in 5b, but with the pH increasing step to a pH of 7.1.

Subsequently, the high aromatic extract is added. This results in three liquid coffee concentrates (LCC#16-18). For these liquid coffee concentrates it is determined how much acid is hydrolysed per kg dry matter solids as a result of the treatment(s) conducted. The results are given in Table 5 below.

Figure 4:
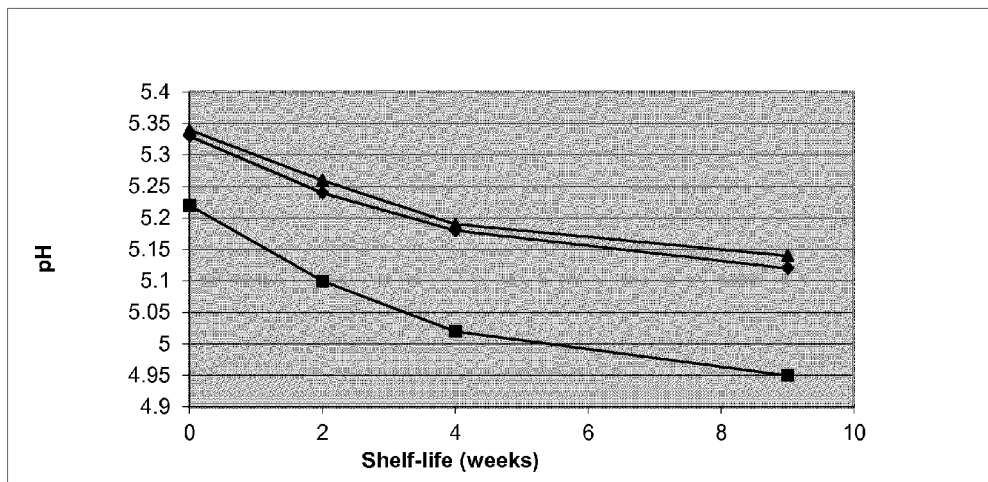
FIG. 4 is a chart depicting the pH level versus time for liquid coffee concentrates prepared in accordance with Example 5 herein, according to one embodiment.

The pH was followed in time as shown in FIG. 4 for LCC#16 (■), 17 (♦), and 18 (▲). During 9 weeks shelf life the products according to the invention do not drop in pH below 5. The QA/QaL mol/mol ratio is then 30 for both LCC#19 and 20. The amount of potassium is 44.4 g/kg dry matter and the amount of sodium is 2.2 g/kg dry matter.

TABLE 5

Resulting liquid coffee concentrates (LCC) of Example 5

| LCC# | Based on sample# | Dry matter solids | Acid hydrolysis (mmol/ kg d.m.) | β-damascenone (μg/kg d.m.) | 2-phenyl-3-(2-furyl)-2-propenal (mg/kg d.m.) |
|---|---|---|---|---|---|
| $16_{ref}$ | 5a | 20 | — | 5.0 | — |
| 17 | 5b | 20 | 210 | 7.2 | 1.3 |
| 18 | 5c | 20 | 215 | 7.7 | — |

EXAMPLE 6

In an experiment similar to Example 2, extracts ii) and iii) are combined and divided into two batches (6a, 6b), which are subjected to the following parallel treatments:
6a evaporation to a concentration of 38% of dry matter solids;
6b a pH increasing step (pH=6), followed by evaporation to a concentration of 38% of dry matter solids, and then followed by a heat treatment of 10 minutes at 160° C.

The two batches are mixed resulting in three liquid coffee concentrates:
6c–100% 6a;
6d–50% 6a+50% 6b;
6e–25% 6a+75% 6b.

Subsequently, the high aromatic extract is added. This results in three liquid coffee concentrates (LCC#19-21). For these liquid coffee concentrates it is determined how much acid is hydrolysed per kg dry matter solids as a result of the treatment(s) conducted. The results are given in Table 6 below.

Figure 5:
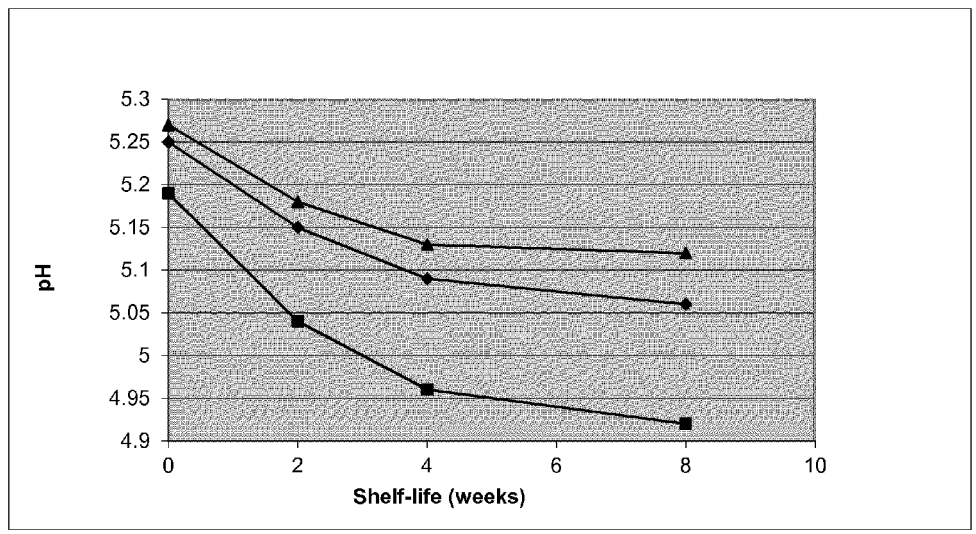
FIG. 5 is a chart depicting the pH level versus time for liquid coffee concentrates prepared in accordance with Example 6 herein, according to one embodiment.

The pH was followed in time as shown in FIG. 5 for LCC#19 (■), 20 (♦), and 21 (▲). During 8 weeks shelf life the products according to the invention do not drop in pH below 5. The QA/QaL mol/mol ratio is then 72 for LCC#20 and 91 for LCC#21. The amount of potassium is 45.7 g/kg dry matter and the amount of sodium is 2.4 g/kg dry matter.

TABLE 6

Resulting liquid coffee concentrates (LCC) of Example 6

| LCC# | Based on sample# | Dry matter solids | Acid hydrolysis (mmol/ kg d.m.) | β-damascenone (μg/kg d.m.) | 2-phenyl-3-(2-furyl)-2-propenal (mg/kg d.m.) |
|---|---|---|---|---|---|
| $19_{ref}$ | 6a | 28 | — | — | 0.6 |
| 20 | 50% 6a + 50% 6b | 28 | 155 | 15.4 | 1.0 |
| 21 | 25% 6a + 75% 6b | 28 | 230 | 16.8 | 1.10 |

EXAMPLE 7

Split stream extraction is conducted as in Example 1. The primary extract has a BD/EG wt/wt ratio of 45. An extract stream (PE2+SE) is concentrated, to a dry matter solids content of 30%, by being subjected to evaporation.

The resulting concentrate is divided into three batches (7a, 7b, and 7c), which are subjected to the following parallel treatments:

7a no treatment;
7b a pH increasing step (pH=6), followed by a heat treatment of 120 seconds at 160° C.;
7c as in 7b, but with the heat treatment at 180° C.

Subsequently, the high aromatic extract is added. This results in three liquid coffee concentrates (LCC#22-24). For these liquid coffee concentrates it is determined how much acid is hydrolysed per kg dry matter solids as a result of the treatment(s) conducted. The results are given in Table 7 below. During 9 weeks shelf life the products according to the invention do not drop in pH below 5.

TABLE 7

Resulting liquid coffee concentrates (LCC) of Example 7

| LCC# | Based on sample# | Dry matter solids | Acid hydrolysis (mmol/ kg d.m.) | β-damascenone (µg/kg d.m.) | 2-phenyl-3-(2-furyl)-2-propenal (mg/kg d.m.) |
|---|---|---|---|---|---|
| $22_{ref}$ | 7a | 25 | — | — | 0.3 |
| 23 | 7b | 25 | 180 | — | 0.5 |
| 24 | 7c | 25 | 320 | 10.7 | 1.4 |

EXAMPLE 8

The set up of this example is identical with that of example 7. The primary extract has a BD/EG wt/wt ratio of 58.

A sample (8a) is directly subjected to evaporation (here to 30% dry matter solids). Two other samples are obtained by first conducting the same pH increasing step as in example 7, and then evaporation to a concentration of 30% dry matter solids.

The latter concentrate is divided into two samples (8b, 8c) which are subjected to heat treatment as follows:

8b 450 seconds at 160° C.;
8c 450 seconds at 180° C.

Subsequently, the high aromatic extract is added. This results in three liquid coffee concentrates (LCC#25-27). For these liquid coffee concentrates it is determined how much acid is hydrolysed per kg dry matter solids as a result of the treatment(s) conducted. The results are given in Table 8 below.

TABLE 8

Resulting liquid coffee concentrates (LCC) of Example 8

| LCC# | Based on sample# | Dry matter solids | Acid hydrolysis (mmol/kg d.m.) | 2-phenyl-3-(2-furyl)-2-propenal (mg/kg d.m.) |
|---|---|---|---|---|
| $25_{ref}$ | 8a | 25 | — | — |
| 26 | 8b | 25 | 270 | 0.6 |
| 27 | 8c | 25 | 440 | 1.5 |

EXAMPLE 9

Split stream extraction is conducted as in Example 1. The primary extract has a BD/EG wt/wt ratio of 78. An extract stream (PE2+SE) is concentrated, to a dry matter solids content of 30%, by being subjected to evaporation.

The resulting concentrate is divided into three batches (9a, 9b, 9c), which are subjected to the following parallel treatments:

9a no treatment;
9b a pH increasing step (pH=7), followed by a heat treatment of 45 seconds at 160° C.;
9c as in 9b, but with the heat treatment at 180° C.

Subsequently, the high aromatic extract is added. This results in three liquid coffee concentrates (LCC#28-30). For these liquid coffee concentrates it is determined how much acid is hydrolysed per kg dry matter solids as a result of the treatment(s) conducted. The results are given in Table 9 below.

TABLE 9

Resulting liquid coffee concentrates (LCC) of Example 9

| LCC# | Based on sample# | Dry matter solids | Acid hydrolysis (mmol/kg d.m.) |
|---|---|---|---|
| $28_{ref}$ | 9a | 25 | — |
| 29 | 9b | 25 | 140 |
| 30 | 9c | 25 | 235 |

EXAMPLE 10

Split stream extraction is conducted as in Example 1. The primary extract, i.e. the high aromatic coffee extract, comprises 15 wt. % of the total coffee dry matter and has a BD/EG wt/wt ratio of 54. The low aromatic coffee extract (PE2+SE) comprises 68 wt. % secondary extract and 32 wt. % 2nd primary extract on dry matter.

The low aromatic coffee extract (PE2+SE) is divided into two batches (10a and 10b), which are subjected to the following parallel treatments:

10a evaporation to 38% dry matter;
10b a pH increasing step as conducted in Example 1 (pH=6), an evaporation step to 38% dry matter, followed by a heat treatment of 180° C. for 2 minutes.

Separately, an unconcentrated high yield extract (filler (stream F scheme 2)) is made from a second batch of coffee. This extract has a BD/EG wt/wt ratio of 5.8. This filler is divided into two batches (10c and 10d), which are subjected to the following parallel treatments:

10c evaporation to 48% dry matter;
10d a pH increasing step as conducted in Example 1 (pH=6), an evaporation step to 48% dry matter, followed by a heat treatment of 180° C. for 2 minutes.

The low aromatic fraction in this example consist of a mixture of PE2+SE and filler.

Four low aromatic coffee concentrates are prepared by mixing 39 wt % on dry matter of a batch of filler and 61 wt % on dry matter of a batch of (PE2+SE):

10e–10a+10c;
10f–10b+10d;
10g–10b+10c;
10h–10a+10d.

Subsequently, the high aromatic extract is added. This results in four liquid coffee concentrates (LCC#31-34). For these liquid coffee concentrates it is determined how much acid is hydrolysed per kg dry matter solids as a result of the treatment(s) conducted. The results are given in Table 10 below.

Figure 6:
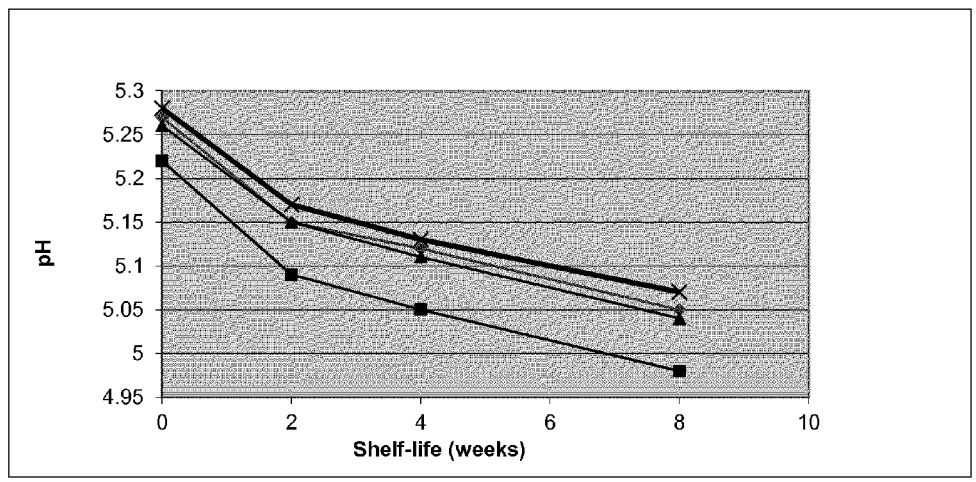
FIG. 6 is a chart depicting the pH level versus time for liquid coffee concentrates prepared in accordance with Example 10 herein, according to one embodiment.

The pH was followed in time as shown in FIG. 6 for LCC#31 (■), 32 (♦), 33 (x), and 34 (▲). During 8 weeks shelf life the products according to the invention do not drop in pH below 5.

TABLE 10

Resulting liquid coffee concentrates (LCC) of Example 10

| LCC# | Based on sample# | Dry matter solids | Acid hydrolysis (mmol/kg d.m.) | 2-phenyl-3-(2-furyl)-2-propenal (mg/kg d.m.) |
|---|---|---|---|---|
| 31$_{ref}$ | 10a + 10c | — | — | — |
| 32 | 10b + 10d | 26 | 160 | 1.1 |
| 33 | 10b + 10c | 26 | 190 | 1.4 |
| 34 | 10a + 10d | 26 | 125 | 0.9 |

Comparative Example

A liquid coffee concentrate having approximate 30% w/w dry solids was obtained by extraction a mixture of 50% *Arabica* and 50% *Robusta* coffee beans and processed according to the steps described in US 2010/0316784.

The pH of the liquid coffee extract was adjusted to 5.7 by addition of edible alkali, i.e. potassium hydroxide.

The resulting coffee concentrate was processed at 145° C. with a holding time of 90 seconds followed by rapid cooling to ambient condition.

The pH of the final product was approximately 5.2.

Only 100 mmoles acid/kg dry matter content in the final product were released. The pH dropped below 5.0 within 8 weeks.

When assessed by experts the product had a sour off taste.

What is claimed is:

1. A process for the production of a liquid coffee concentrate, the process comprising the steps of:
   a) subjecting roasted, ground coffee to one or more extraction steps with water resulting in a coffee extract,
   b) subjecting the coffee extract to separation, either by fractionation during said extraction step(s) or by aroma recovery after said extraction step(s) resulting in a high aromatic coffee extract and a low aromatic coffee extract,
   c) concentrating the low aromatic coffee extract to a dry matter content of at least 10 wt. % to form a low aromatic coffee concentrate,
   d) subjecting at least 25 wt % dry matter of the low aromatic coffee concentrate to a heat treatment of at least 150° C. at a holding time for at most 15 minutes,
   e) combining at least the low aromatic coffee concentrate with the high aromatic coffee extract,
   whereby after step b) a pH increasing step is carried out, thereby obtaining a liquid coffee concentrate, wherein the liquid coffee concentrate has a pH of 4.8 to 6.

2. The process according to claim 1, wherein the heat treatment is conducted at a temperature of at least 150° C. at a holding time of at most 10 minutes.

3. The process according to claim 2, wherein the heat treatment is conducted from 150° C. to 200° C. at a holding time of 10 minutes to 10 seconds.

4. The process according to claim 3, wherein the heat treatment is conducted from 150° C. to 180° C. at a holding time of 10 minutes to 10 seconds.

5. The process according to claim 4, wherein the heat treatment is conducted from 160° C. to 170° C. at a holding time of 5 minutes to 30 seconds.

6. The process according to claim 1, whereby after step b) and before step e) the low aromatic coffee extract or the low aromatic coffee concentrate which is to be heat treated is subjected to a pH increasing step.

7. The process according to claim 6, wherein the pH increasing step is carried out between step b) and step c).

8. The process according to claim 1, wherein the pH increasing step is carried out between step c) and step d).

9. The process according to claim 7, wherein the pH is raised to a value of 6 to 8.

10. The process according to claim 1, wherein the pH increasing step is carried out between step d) and step e).

11. The process according to claim 1, wherein the pH increasing step is carried out after step e).

12. The process according to claim 10, wherein the pH is raised to a value of 5 to 6.

13. The process according to claim 1, wherein the pH is raised with an anion exchanger.

14. The process according to claim 1, wherein the low aromatic coffee extract is concentrated to a dry matter content of 10 to 60% by weight.

15. The process according to claim 1, wherein at least 50 wt % dry matter of the low aromatic coffee concentrate is subjected to the heat treatment.

16. The process according to claim 1, wherein the process results in a hydrolysation of at least 120 mmoles acid/kg dry matter solids content in the liquid coffee concentrate.

17. The process according to claim 8, wherein the pH is raised to a value of 6 to 8.

18. The process according to claim 11, wherein the pH is raised to a value of 5 to 6.

19. The process according to claim 13, wherein the pH is raised with an anion exchange column.

20. The process according to claim 1, wherein the low aromatic coffee extract is concentrated to a dry matter content of 15 to 50% by weight.

21. The process according to claim 1, wherein the low aromatic coffee extract is concentrated to a dry matter content of 15 to 40% by weight.

22. The process according to claim 1, wherein at least 75 wt % dry matter of the low aromatic coffee concentrate is subjected to the heat treatment.

23. The process according to claim 1, wherein all of the low aromatic coffee concentrate is subjected to the heat treatment.

24. The process according to claim 1, wherein the process results in hydrolysation of at least 150 mmoles acid/kg dry matter solids content in the liquid coffee concentrate.

25. The process according to claim 1, wherein the process results in hydrolysation of at least 180 mmoles acid/kg dry matter solids content in the liquid coffee concentrate.

\* \* \* \* \*